United States Patent
Kunisch

[19]

[11] Patent Number: 6,141,416
[45] Date of Patent: Oct. 31, 2000

[54] ANALOG TELEPHONE SUBSCRIBER TERMINAL APPARATUS

[75] Inventor: Paul Kunisch, Puchheim, Germany

[73] Assignee: Siemens Aktiengesellschaft, Munich, Germany

[21] Appl. No.: 08/920,571

[22] Filed: Aug. 29, 1997

[30] Foreign Application Priority Data

Aug. 29, 1996 [DE] Germany ............... 196 35 021

[51] Int. Cl.[7] .................. H04M 1/56; H04M 15/06; H04M 1/00; H04M 3/00
[52] U.S. Cl. .................. 379/413; 379/142; 379/377; 379/380
[58] Field of Search .................... 379/413, 324, 379/142, 377, 380, 188, 373, 322, 387, 418, 419, 199, 93.05, 93.23, 201

[56] References Cited

U.S. PATENT DOCUMENTS

| | | | |
|---|---|---|---|
| 4,242,539 | 12/1980 | Hashimoto | 379/142 |
| 4,320,258 | 3/1982 | McDonald | 379/142 |
| 4,547,629 | 10/1985 | Corless | 379/413 |
| 5,117,452 | 5/1992 | Callele et al. | 379/142 |
| 5,263,084 | 11/1993 | Chaput et al. | 379/142 |
| 5,461,670 | 10/1995 | Consiglio et al. | 379/387 |
| 5,546,448 | 8/1996 | Caswell et al. | 379/142 |
| 5,553,138 | 9/1996 | Heald et al. | 379/324 |
| 5,659,602 | 8/1997 | Gay | 379/142 |
| 5,771,281 | 6/1998 | Batten, Jr. | 379/93.23 |

*Primary Examiner*—Forester W Isen
*Assistant Examiner*—Jacques M. Saint-Surin
*Attorney, Agent, or Firm*—Hill & Simpson

[57] ABSTRACT

An analog telephone subscriber terminal apparatus with means for realizing additional functions is provided. In the on-hook state of the subscriber terminal apparatus, and outside of the idle operating state of the subscriber terminal apparatus, a current supply device that draws current from the subscriber line and is integrated into the terminal apparatus is switched effective for the duration of the reception of data containing the additional functions. The current supply device provides the supply current to the means for realizing the additional functions, but is limited to such an extent that the increased subscriber line loop current that then flows is not indicated as a loop closure.

2 Claims, 1 Drawing Sheet

ANALOG TELEPHONE SUBSCRIBER TERMINAL APPARATUS

BACKGROUND OF THE INVENTION

1. Field of the Invention

The invention is directed to an analog telephone subscriber terminal apparatus which is remotely connected to an exchange by a subscriber terminal line and which comprises means for evaluating, storing and displaying data that is received from the exchange while simultaneously outside of the "idle" switching state and in the "on-hook" state, the data being connected with additional functions.

2. Description of the Prior Art

Typically, a telephone subscriber terminal apparatus must be high-ohmic in the on-hook state since, in the idle switching state, the supply current in the associated terminal circuit is provided at a high resistance to save current. Another reason for the high-ohmic requirement is that, in the indication circuit for the evaluation of subscriber line signaling, a low event threshold is switched effective. Further, it must also be taken into account that several telephone subscriber terminal apparatuses may be connected in parallel.

For these reasons, an additional local current supply, fed from the current network, is normally used to supply the means for providing additional functions to the telephone subscriber terminal apparatus. Such additional functions include, for example, displaying the name and phone number of the calling subscriber.

An object of the present invention, therefore, is to provide an analog telephone subscriber terminal apparatus which does without such a local current supply, derived from the current conducting network, in order to realize the desired additional functions. This object is achieved in an a analog telephone subscriber terminal apparatus having a current supply device which draws current from a subscriber line and then provides the supply current, when switched effective, for the means for realizing the additional functions—the device limiting the increased subscriber line loop current such that it does not provide a loop closure.

In an embodiment of the present invention, the means for realizing additional functions is remotely connected to the exchange by the subscriber terminal line, as is the remote telephone subscriber terminal apparatus in connection with the "telephone" function. For such purpose, a current supply device, which receives current from the subscriber terminal line, is provided as a component of the telephone terminal apparatus. However, this current supply device is activated only for the duration of the transmission of the data concerning such additional items of information. This is the case only when the apparatus is outside of the idle switching state and, thus, during a time when the event threshold in the indication circuit at the side of the exchange is "high" for the subscriber line signal relative to the idle operating state. In this stage, it is also possible both to make a sufficient supply current available for the current supply device, and to limit the current to such an extent that its use is not falsely interpreted as the closure of the subscriber line loop.

In an embodiment, the current supply device is supplemented by a high-ohm chargeable energy storage element that provides the initial required supply current for a data transmission recognition circuit. The current supply device is thereby realized in the form of a current regulator circuit which can be activated and deactivated by the recognition circuit. The regulator circuit, therefore, takes over the current supply for the data transmission recognition circuit. In this embodiment, it is ensured that a supply current is available for the data transmission recognition circuit at the beginning of a data transmission, without violating the requirement that the telephone subscriber terminal apparatus have a high resistance at the time before the data transmission. During the course of the data transmission, it is also ensured that a sufficient supply current is available for the evaluation means while the relatively low-resistance state of the telephone subscriber terminal apparatus which arises does not last longer than the duration of the data transmission.

In an embodiment, a filter circuit and a rectifier circuit are also provided which, at the beginning of a telephone call, provide the charge current for the energy storage element at low resistance from the AC call current. This embodiment is important for the realization of additional functions which are not to be executed until after the arrival of the first call and which represent a rapid charge device for the energy storage element. As a result, disturbing delays in the activation of the current supply device, due to the charge time required for the charging of the energy storage element, cannot occur when the telephone subscriber terminal apparatus is used in quick succession.

Additional features and advantages of the present invention are described in, and will be apparent from, the detailed description of the presently preferred embodiments and from the drawings.

DETAILED DESCRIPTION OF THE PREFERRED EMBODIMENTS

Figure 1:
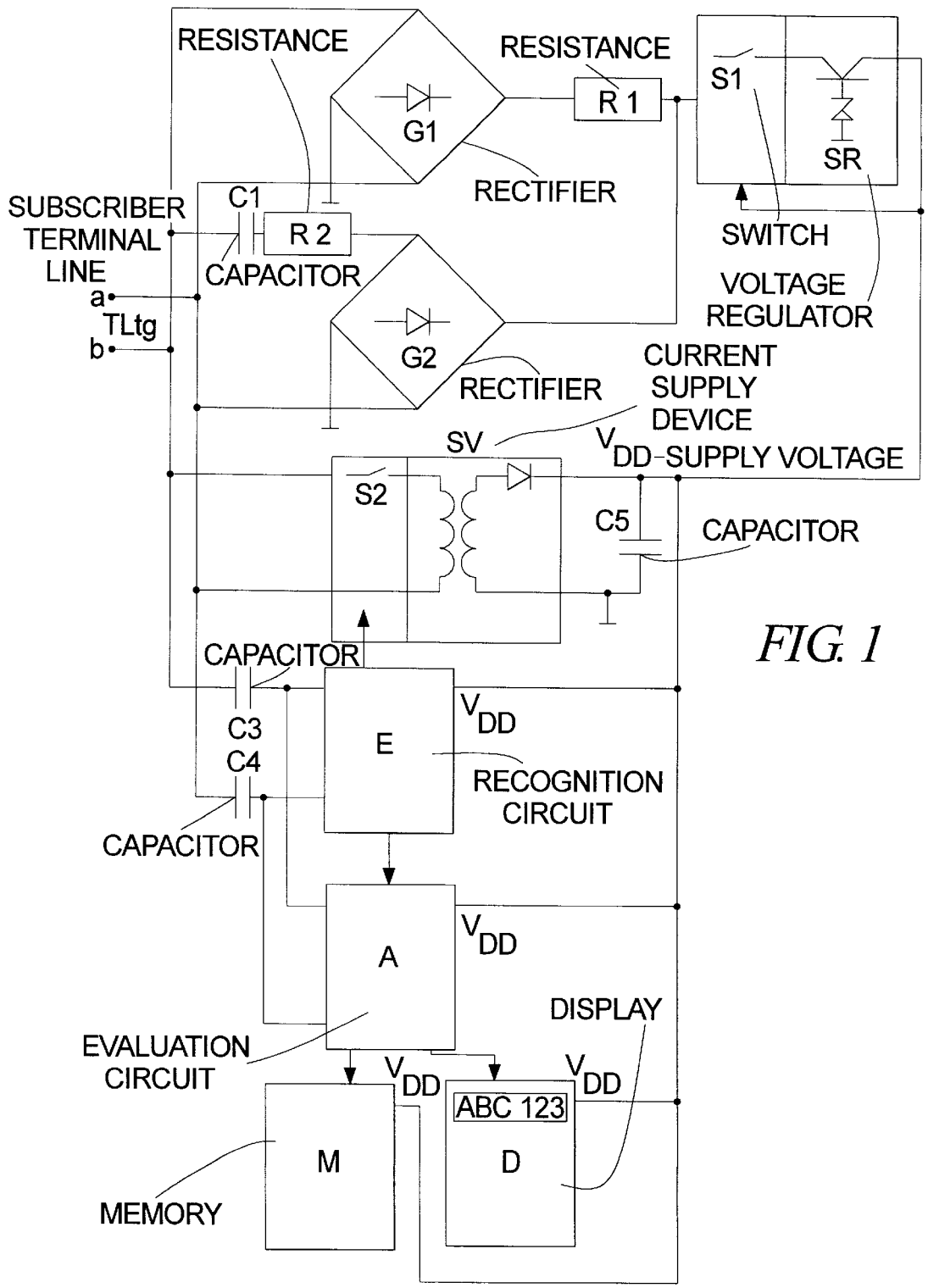
FIG. 1 shows a schematic diagram of an analog telephone subscriber terminal apparatus in accordance with the principles of the present invention.

Referring to FIG. 1, a telephone subscriber terminal apparatus is shown wherein a recognition circuit E, as well as an evaluation circuit A, are connected to leads a and b of subscriber terminal line TLtg via coupling capacitors C3 and C4. The recognition circuit E responds to the receipt of data transmitted to the telephone subscriber terminal apparatus from an exchange relating to various desired additional functions; such transmissions occurring in an on-hook state and outside of an idle switching state. The recognition circuit E prepares the evaluation circuit A, which carries out a decoding of such data, to operate with the transmitted data. The evaluation circuit A supplies both a memory M and a display D with input signals derived from the data received, The recognition circuit E, the evaluation circuit A, the memory M and the display D all require a supply voltage $V_{DD}$ for their operation, the provision of which is intended as part of the invention.

FIG. 1 additionally shows a rectifier G1 connected to the leads a and b of the subscriber terminal line TLtg. The rectifier G1 supplies the charge current for an energy storage element, shown in the form of a charge capacitor C5, via a high-ohmic resistance R1 and a voltage regulator SR which is accessible by a switch S1. By means of the switch S1, when the charge capacitor C5 is charged to the maximum operating voltage, the voltage regulator SR is taken out of service or, if a discharge to a minimum value has taken place, is switched active again.

Normally, in the idle operating state, the charge capacitor C5 will be sufficiently charged to provide enough supply current for the recognition circuit E during a data transmission to the telephone subscriber terminal apparatus, wherein the transmission is connected with an additional function.

As soon as the recognition circuit E has recognized the beginning of such a data transmission, it will supply an actuation signal to a circuit S2 of a current supply device SV. The current supply device SV is also connected to the subscriber terminal line TLtg and is thereby activated. In the present exemplary embodiment, the current supply device SV takes the form of a switching regulator with current limitation, and from such point forward draws a supply current from the subscriber terminal line TLtg which also serves the afore-mentioned evaluation circuit A, memory M and display D. The current limitation effected by the switching regulator is performed in such a way that an indication circuit in the subscriber terminal line TLtg located in the exchange, which services for the indication of the subscriber line signaling or the recognition of loop current changes due to loop closure and loop interruption, does not respond falsely.

In operating states other than idle, particularly in a "conversation" operating state in which the data transmission under consideration takes place, the response threshold of the indication circuit is significantly higher than in the idle operating state so that the required current limitation does not hinder the flowing of a sufficiently high supply current for the evaluation circuit A, memory M and display D.

At the end of the data transmission, detected by the recognition circuit E, an actuation signal emitted by the recognition circuit E for the switch S2 deactivates the current supply means SV of the telephone subscriber terminal apparatus so that it again assumes its high-ohm state.

FIG. 1 also shows a rectifier G2 applied to the leads of the subscriber terminal line TLtg via an RC element filter circuit consisting of a resistance R2 and a capacitor C1. The output signal of the rectifier G2 is supplied to the storage capacitor C5 at low resistance via the switch S1 and the voltage regulator SR. A charge current for the storage capacitor C5 is provided by these components given the flowing of an AC call current. This circuit variant, which is preferably present as a supplement to the switching elements that effect a high-resistance charging of the storage capacitor C5, is important for the case of such additional functions which occur only after the arrival of a first call. Such additional functions include the displaying of a caller name and the telephone number of such caller, which are not of interest to the receiver of the call until attention has been brought by a ringing telephone signal. The rapid charging of the storage capacitor C5, effected by the AC call current, ensures orderly operation when a second call ensues shortly after the end of the first call. Under such circumstances, the storage capacitor C5 normally would not yet have been sufficiently charged via the high-ohm resistance R1 to be able to provide a sufficient supply current for the recognition circuit E.

Although the present invention has been discussed with reference to a specific embodiment, those of skill in the art will recognize that changes may be made thereto without departing from the spirit and scope of the invention as set forth in the hereafter appended claims.

What is claimed is:

1. An analog telephone subscriber apparatus remotely connected to an exchange by a subscriber terminal line, the apparatus comprising:

a data transmission recognition circuit for recognizing a beginning of a data transmission related to various auxiliary functions, the data transmission occurring in an on-hook state and outside of an idle operating state;

an evaluation circuit connected to the subscriber terminal line to receive data from the exchange in the on-hook state and outside of an idle switching state;

a memory connected to the evaluation circuit;

a display connected to the evaluation circuit;

a high-ohm energy storage device for providing sufficient supply current to the data transmission recognition circuit at the beginning of the data transmission;

a first rectifier circuit connected to the subscriber terminal line for providing the energy storage device with a charge current via a high-ohmic resistor and a voltage regulator during the idle operating state;

a second rectifier circuit connected to the subscriber terminal line via an RC filter circuit, the second rectifier circuit for providing the energy storage device with the charge current in rapid-charging and low-resistance fashion during conversation operating state; and an integrated current supply device, the current supply device connected to the subscriber terminal line for receiving current and, in turn, providing supply current to each of the evaluation circuit, the memory and the display, the current supply device being activated by the recognition circuit only for the duration of the data transmission and limiting the current taken from the subscriber terminal line to a value less than a threshold value which is effective outside of the idle switching state for indexing subscriber signaling.

2. The analog telephone subscriber apparatus as claimed in claim 1, wherein the integrated current supply device is activated and deactivated by the data transmission recognition circuit so as to provide the supply current to the evaluation circuit, the memory and the display.

* * * * *